US009731829B2

United States Patent
Gow et al.

(10) Patent No.: US 9,731,829 B2
(45) Date of Patent: Aug. 15, 2017

(54) TABLE ARRANGEMENT

(71) Applicant: Zodiac Seats UK Limited, Cwmbran (GB)

(72) Inventors: Robert Gow, Chepstow (GB); Paul Morgan, Nantyglo (GB)

(73) Assignee: Zodiac Seats UK Limited, Cwmbran (GB)

( * ) Notice: Subject to any disclaimer, the term of this patent is extended or adjusted under 35 U.S.C. 154(b) by 133 days.

(21) Appl. No.: 14/679,117

(22) Filed: Apr. 6, 2015

(65) Prior Publication Data

US 2015/0284091 A1 Oct. 8, 2015

(30) Foreign Application Priority Data

Apr. 7, 2014 (GB) .................................. 1406239.2

(51) Int. Cl.
| | | |
|---|---|---|
| *B64D 11/06* | (2006.01) | |
| *A47B 3/14* | (2006.01) | |
| *B60N 3/00* | (2006.01) | |
| *A47B 3/00* | (2006.01) | |

(52) U.S. Cl.
CPC .......... *B64D 11/0638* (2014.12); *A47B 3/002* (2013.01); *A47B 3/14* (2013.01); *B60N 3/001* (2013.01); *B60N 3/002* (2013.01); *B60N 3/004* (2013.01)

(58) Field of Classification Search
CPC ....... B64D 11/0638; A47B 3/14; B60N 3/001; B60N 3/002; B60N 3/004
See application file for complete search history.

(56) References Cited

U.S. PATENT DOCUMENTS

| | | | |
|---|---|---|---|
| 8,205,564 B2* | 6/2012 | St. Louis ........... | B64D 11/0638 108/147 |
| 9,010,852 B1* | 4/2015 | Conrad ............... | B60R 11/0229 297/135 |
| 9,150,129 B2* | 10/2015 | Suhre .................. | B60N 2/4606 |

(Continued)

FOREIGN PATENT DOCUMENTS

| | | |
|---|---|---|
| JP | H09136576 A2 | 5/1997 |
| JP | 2002166771 A2 | 6/2002 |
| WO | 2011133969 A1 | 10/2011 |

OTHER PUBLICATIONS

Great Britain Patent Application No. 1406239.2, Search Report issued Oct. 17, 2014, 3 pages.

*Primary Examiner* — Timothy J Brindley

(74) *Attorney, Agent, or Firm* — Kilpatrick Townsend & Stockton LLP; Dean W. Russell

(57) ABSTRACT

The present invention provides a table arrangement comprising a table moveably mounted to a table mounting structure, a compensation arrangement connected between the table and table mounting structure for reducing the force required to lift the table from a lowered position to a raised position, and a damper arrangement for reducing the speed of the table as it moves from the raised position to the lowered position, wherein the compensation arrangement is mounted on a shaft, such that as the table is lowered, the shaft rotates about its longitudinal axis and wherein the damping arrangement is arranged to act on the shaft to reduce the speed of its rotation about its longitudinal axis. The invention also provides an aircraft seat module and a method of deploying or stowing a table arrangement.

18 Claims, 4 Drawing Sheets

(56) References Cited

U.S. PATENT DOCUMENTS

| | | | |
|---|---|---|---|
| 2007/0227407 A1 | 10/2007 | Cartensen | |
| 2008/0120785 A1* | 5/2008 | Collins | B60N 3/002 |
| | | | 5/658 |
| 2010/0326331 A1* | 12/2010 | St. Louis | B64D 11/00 |
| | | | 108/44 |
| 2012/0032479 A1* | 2/2012 | Suhre | B60N 3/102 |
| | | | 297/188.01 |
| 2012/0133180 A1* | 5/2012 | Moulton | B64D 11/0605 |
| | | | 297/135 |
| 2012/0204771 A1* | 8/2012 | Fukuhara | A47B 5/04 |
| | | | 108/134 |
| 2014/0300148 A1* | 10/2014 | Frost | B64D 11/06 |
| | | | 297/173 |
| 2015/0115668 A1* | 4/2015 | Martinak | B60N 3/004 |
| | | | 297/163 |
| 2015/0284089 A1* | 10/2015 | Gow | B64D 11/0605 |
| | | | 297/147 |
| 2016/0083096 A1* | 3/2016 | Gagnon | B64D 11/06 |
| | | | 108/20 |
| 2016/0167555 A1* | 6/2016 | Allen | B60N 3/004 |
| | | | 108/40 |

* cited by examiner

TABLE ARRANGEMENT

CROSS-REFERENCE TO RELATED APPLICATION

This application claims priority to Great Britain Application No. 1406239.2, filed Apr. 7, 2014, entitled "A Table Arrangement," which is incorporated herein by reference in its entirety.

BACKGROUND OF THE INVENTION

The present invention concerns a table arrangement for use in an aircraft seat module. More particularly, but not exclusively, this invention concerns the table arrangement comprising a table mounting structure, a table moveably mounted to the table mounting structure such that it can move between a lowered position and a raised position, a compensation arrangement connected between the table and table mounting structure for reducing the force required to lift the table from the lowered position to the raised position, and a damper arrangement for reducing the speed of the table as it moves from the raised position to the lowered position. The invention also concerns an aircraft seat module and a method of deploying or stowing a table arrangement.

A prior art table arrangement comprises a table and table mounting structure where a constant force sprung band wound around a spool (compensation arrangement) is used to assist in the raising of the table from a lowered position to a raised position. The spool is rotatably mounted to the table mounting structure and a free end of the sprung band is attached to the table. The compensation arrangement acts to help pull the table up to the raised position.

In addition, there is also a damping arrangement to slow down the table as it falls from its raised position to its lowered position. The damping arrangement comprises a rack and pinion mechanism, with the rack mounted to the table mounting structure. The rack is a vertical bar with a mesh on one side of it. A cog (with corresponding teeth to the mesh) is rotatably mounted on the table such that the teeth interlock with the mesh of the rack. Hence, the cog on the table rotates as the table moves up and down in relation to the rack. The cog's rotation on its axis is damped by a rotary damper.

The rack and pinion mechanism can often be heavier and more complicated than is ideal. This adds weight to the table arrangement (especially undesirable in relation to an aircraft seat module) and can make maintenance, manufacture and repair more complicated and time-consuming, and therefore, more expensive.

The present invention seeks to mitigate the above-mentioned problems. Alternatively or additionally, the present invention seeks to provide an improved table arrangement.

SUMMARY OF THE INVENTION

The present invention provides, according to a first aspect, a table arrangement for use in an aircraft seat module, the table arrangement comprising a table mounting structure, a table moveably mounted to the table mounting structure such that it can move between a lowered position and a raised position, a compensation arrangement connected between the table and table mounting structure for reducing the force required to lift the table from the lowered position to the raised position, and a damper arrangement for reducing the speed of the table as it moves from the raised position to the lowered position, wherein the compensation arrangement is mounted on a shaft, such that as the table is lowered, the shaft rotates about its longitudinal axis and wherein the damping arrangement is arranged to act on the shaft to reduce the speed of its rotation about its longitudinal axis.

This allows the damping arrangement to be much smaller as there is no need for a separate rack and pinion mechanism, for example. I.e. instead of providing damping in relation to a separate movement (the table in relation to the rack of the table mounting structure), the damping is provided by damping an existing shaft (associated with the compensation arrangement).

Importantly, the damping arrangement acts on the shaft associated with the compensation arrangement. It does not simply provide damping elsewhere, for example on a separate arrangement between the table and table mounting structure (that inevitably may also damp the rotation of the shaft).

Preferably, the damping arrangement acts directly on the shaft.

Preferably, the damping arrangement is uni-directional. In other words, it only reduces the speed of the table as it moves from the raised position to the lowered position—it does not reduce the speed of the table as it moves from the lowered position to the raised position.

Preferably, the compensation arrangement comprises a spool mounted on the shaft and an elongate member for winding onto and unwinding from the spool during lowering and raising of the table, wherein the compensation arrangement is biased such that the elongate member is urged to wind onto or unwind from the spool.

More preferably, lowering and raising of the table causes winding onto and unwinding from the spool by the elongate member, and rotation of the spool.

Even more preferably, the elongate member winds onto the spool during raising of the table. In this case, the elongate member unwinds from the spool during lowering of the table.

Preferably, the spool is fixedly mounted on the shaft such that rotation of the spool causes rotation of the shaft about its longitudinal axis.

Preferably, the elongate member is biased to wind onto the spool. If the elongate member winds onto the spool during raising of the table, this biases the table to the raised position.

More preferably, the elongate member is urged to wind onto the spool by a spring returning towards its default position, and wherein the spring is tensioned away from its default position when the elongate member is unwound from the spool.

Even more preferably, the elongate member comprises the spring. Even more preferably, the elongate member is the spring.

Preferably, the shaft is caused to rotate by the compensation arrangement.

Preferably, the shaft is mounted to the table and a free end of the elongate member is attached to the table mounting structure.

Preferably, the damping arrangement comprises a rotary damper mounted on the shaft, coaxially with the compensation arrangement. More preferably, the damping arrangement and the compensation arrangement are close to each other (proximate). Even more preferably, the damping arrangement and the compensation arrangement are at the same end of the table (or table mounting structure) as each other. Even more preferably, the damping arrangement and the compensation arrangement are directly adjacent to each other.

Preferably, the direction of table movement between the lowered and raised positions is approximately within the plane of the table. In other words, the table does not move substantially out of its plane between the lowered and raised positions. This means that the table movement between these positions requires only a small space. For example, the table could be vertical and move vertically from the lowered position to the raised position, thus only needing a small space in order to provide for this movement.

Preferably, the table mounting structure comprises a housing which stows the table in the lowered position.

Preferably, the table is slidably mounted to the table mounting structure with a cam follower and cam track arrangement.

Preferably, the raised position is a deployed position and the lowered position is a stowed position.

More preferably, the raised position is a partly deployed position. In other words, the table is further moved from the raised position to a fully deployed position.

Even more preferably, the table will fall under its own weight (under gravity) from the raised position to the lowered position and wherein the table needs to be assisted by a user to move it from the fully deployed position to the raised position. For example, the table may be held by gravity in the fully deployed (for example, horizontal) position, by use of a stop. The table then needs to be rotated towards the raised position (for example, substantially vertical) so that it reaches past a "tipping point" and falls under gravity to the lowered position.

According to a second aspect of the invention there is also provided an aircraft seat module comprising a seat, and a table arrangement as described above, and wherein the table mounting structure is mounted to the aircraft seat module.

Preferably, the table is arranged such that it moves substantially vertically between the lowered and raised positions.

According to a third aspect of the invention there is also provided an aircraft comprising a table arrangement or aircraft seat module as described above.

According to a fourth aspect of the invention there is also provided a method of deploying and stowing a table arrangement of an aircraft seat module, the table arrangement comprising a table mounting structure and a table moveably mounted to the table mounting structure such that it can move between a lowered stowed position and a raised at least partly deployed position, a compensation arrangement connected between the table and table mounting structure and mounted on a shaft, and a damping arrangement, the method comprising the steps of raising the table, with the assistance of the compensation arrangement, from the lowered position to the raised position, and lowering the table, with the assistance of gravity, thus causing the shaft to rotate and the damper arrangement to act on the shaft to reduce the speed of its rotation about its longitudinal axis, thereby reducing the speed of the table as it moves from the raised position to the lowered position.

The movement of the table from a stowed position (where the table is flush with or beneath a housing) to a presented position (where the table is protruding from the housing such that it can be pulled up and be raised into a deployed position) is described and claimed in UK patent application entitled "A Table Arrangement" with agent's reference "P022768 GB ECT", having the same filing date as the present application. The contents of that application are fully incorporated herein by reference. The claims of the present application may incorporate any of the features disclosed in that patent application.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
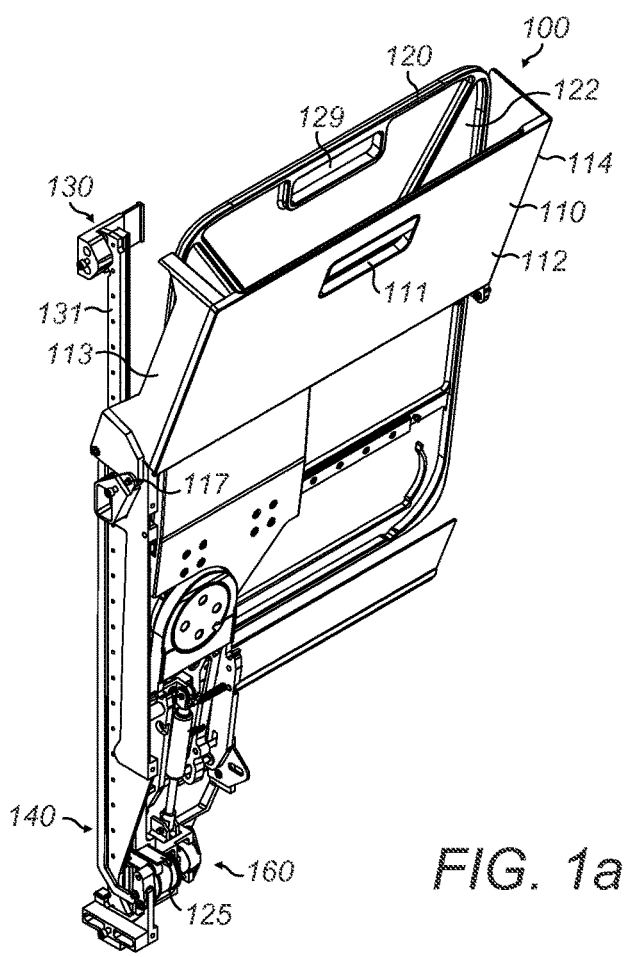
FIG. 1a shows a perspective view of a table arrangement according to a first embodiment of the invention, in a presented configuration.
Figure 1B:
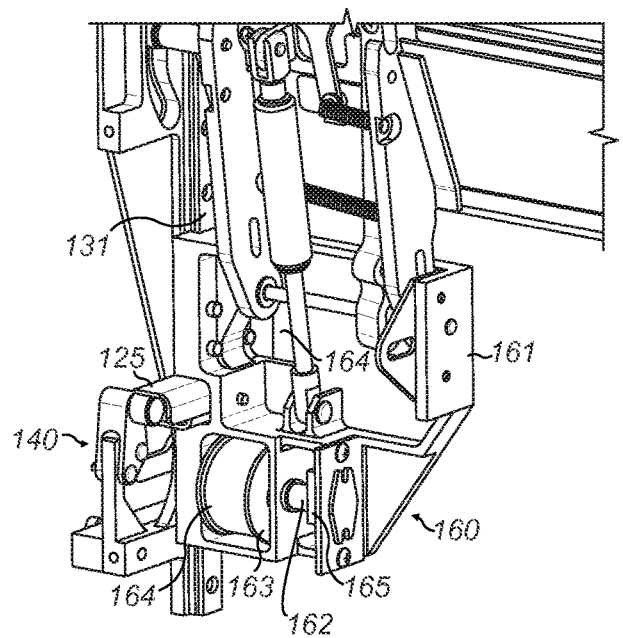
FIG. 1b shows an enlarged view of a damping and compensation arrangement of part of the table arrangement of FIG. 1a, in the presented configuration.

FIGS. 1a and 1b show views of a table arrangement 100 according to a first embodiment of the invention, in a presented configuration.

The table arrangement 100 comprises a door 110 with a rectangular front face 112, a left side panel 113 and a right side panel 114. A handle 111 is located towards the top of the front face 112. The door 110 is pivotally mounted to a table housing 130. The door is pivotally mounted by hinges 117 on the two side panels 113, 114 towards the front and bottom of the side panels. The door 110 also has a cam track (not shown) on the internally facing surface of the side panel 114.

Here, the door 110 has been opened by pulling on the handle 111 to pivot the door 110 on the hinges 117 by approximately 20 to 30 degrees.

A table 120 is presented in the housing 130 at substantially at the same angle as the door 110, with the top edge protruding above a top portion of the door 110. The table has a working table surface 121 (shown in FIG. 2a) and an underneath surface 121 (seen in FIG. 1a, among others). The table 120 also comprises a finger hold 129 on its underneath surface 122 for allowing a user/passenger to pull the table 120 out of the housing 130.

A mechanical linkage 140 connects the table 120 to the door 110 such that opening the door automatically moves the table from a stowed position to this presented position, where the top edge of the table protrudes above the door 110. The mechanical linkage 140 is connected to an activation portion 125 of the table 120 at the bottom of the housing 130.

A damping and compensation arrangement 160 is connected between the table 120 and the housing 130 to reduce the speed of the table 120 when it is dropped from a deployed or the presented position to the stowed position and to allow the table 120 to be lifted more easily from the presented position to a partially deployed position (in FIGS. 2a to 2d).

The damping and compensation arrangement 160 comprises a frame 161, attached to the table 120 and mounted on a slide 131 of the housing 130. The frame 161 rises when the table 120 rises and lowers when the table 120 lowers.

On the frame is a rotatable shaft 162. On the shaft 162 is fixedly mounted a spool 163. The spool has a band 164 wound onto it, with one end portion of the band being wound 164a on the spool and the opposite end portion 164b being unwound from the spool 163. The opposite end of the band 164 is fixedly attached at 166 to the housing 130.

The band 164 is a constant force spring that is biased to be wound onto the spool 163. The spring force is less than the weight of the table, so that it counter acts most of the weight of the table but a small force is still needed by the user to raise the table.

A uni-directional rotary damper 165 is mounted on the same shaft 162 and can damp the rotation of the shaft 162 when it rotates in a given direction (the direction of the shaft 162 when the band unwinds).

Figure 2A:
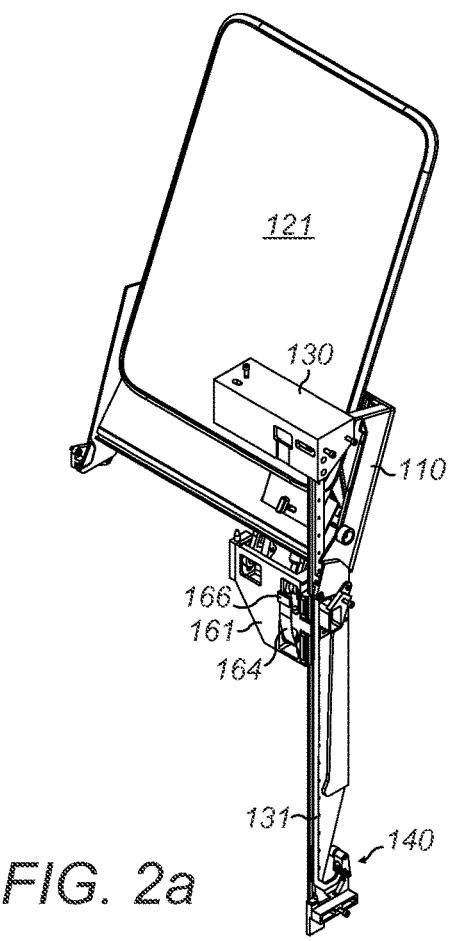
FIG. 2a shows a perspective view of the table arrangement in fully deployed configuration.
Figure 2B:
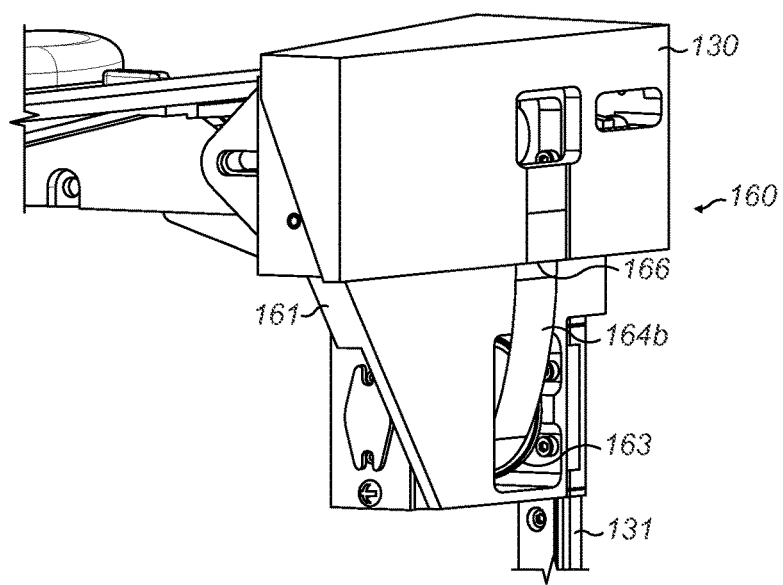
FIG. 2b shows an enlarged view of the damping and compensation arrangement in the partially deployed configuration.
Figure 2C:
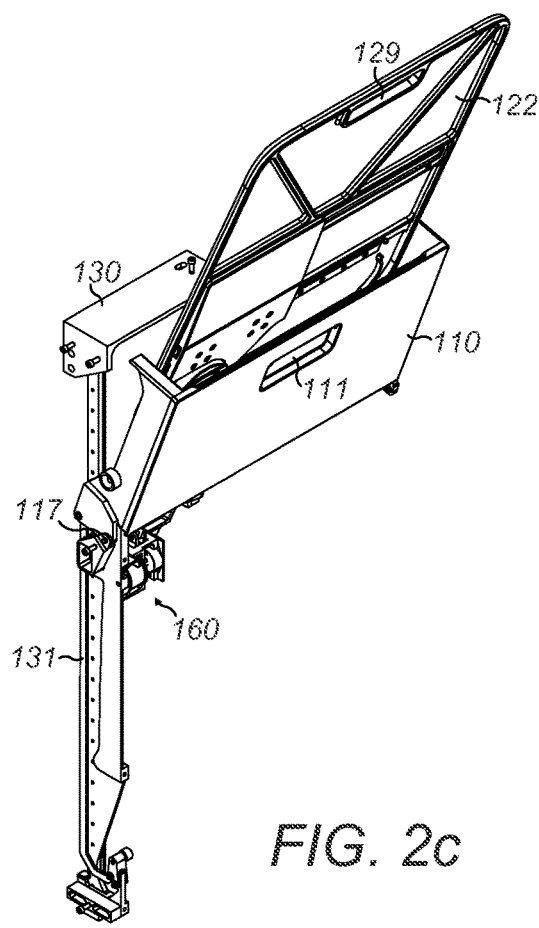
FIG. 2c shows a different perspective view of the table arrangement in the partially deployed configuration.
Figure 2D:
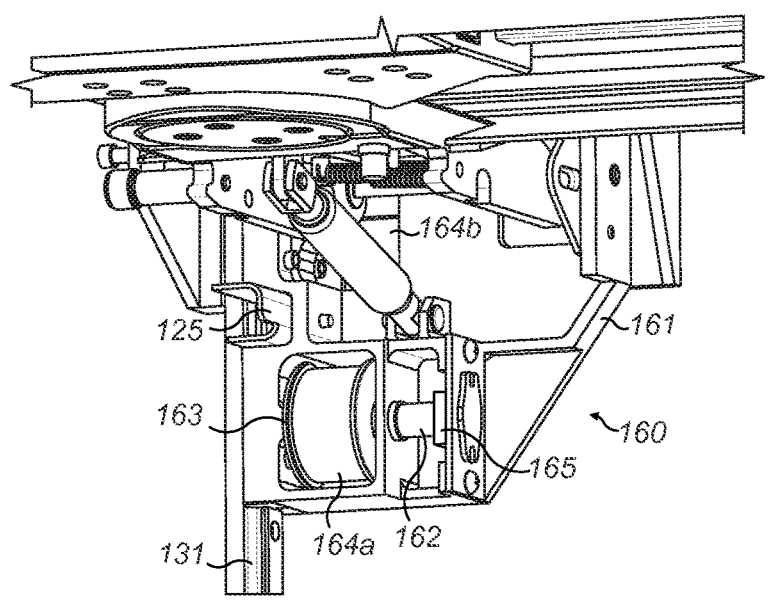
FIG. 2d shows a different enlarged view of the damping and compensation arrangement in the fully deployed configuration.

From the presented position, a user/passenger can lift the table 120 (by pulling on finger hold 129) to the partially deployed position of FIGS. 2a and 2c. The table 120 is provided with a cam follower nodule (not shown) that is arranged inside the cam track of the door 110. Hence, when pulling on the table 120, the table 120 follows the path dictated by the cam track.

When the table rises (pulled up by a user), the spring band 164 is wound onto the spool (biased to do so) and the spool rotates in a first direction, rotating the shaft 162 in the same direction. This releases tension in the spring band 164 towards its default (retracted/wound) position.

When the table lowers (allowed to fall under gravity), the spring band 164 is unwound the spool (tensioning the band away from its default wound position) and the spool rotates in an opposite direction, rotating the shaft 162 in the same opposite direction. The rotary damper 165 damps the rotation of the shaft when it rotates in this opposite direction. Hence, the rotation of the spool 163 is slowed down and the unwinding of the band 164 is slowed down. This slows down the speed of the lowering table 120. Importantly, the overall net downwards force of the table 120 (its weight minus the tensioning of the internal spring and the force from the rotary damper 165) is still positive and so the table still lowers without additional force from the user.

Figure 3:
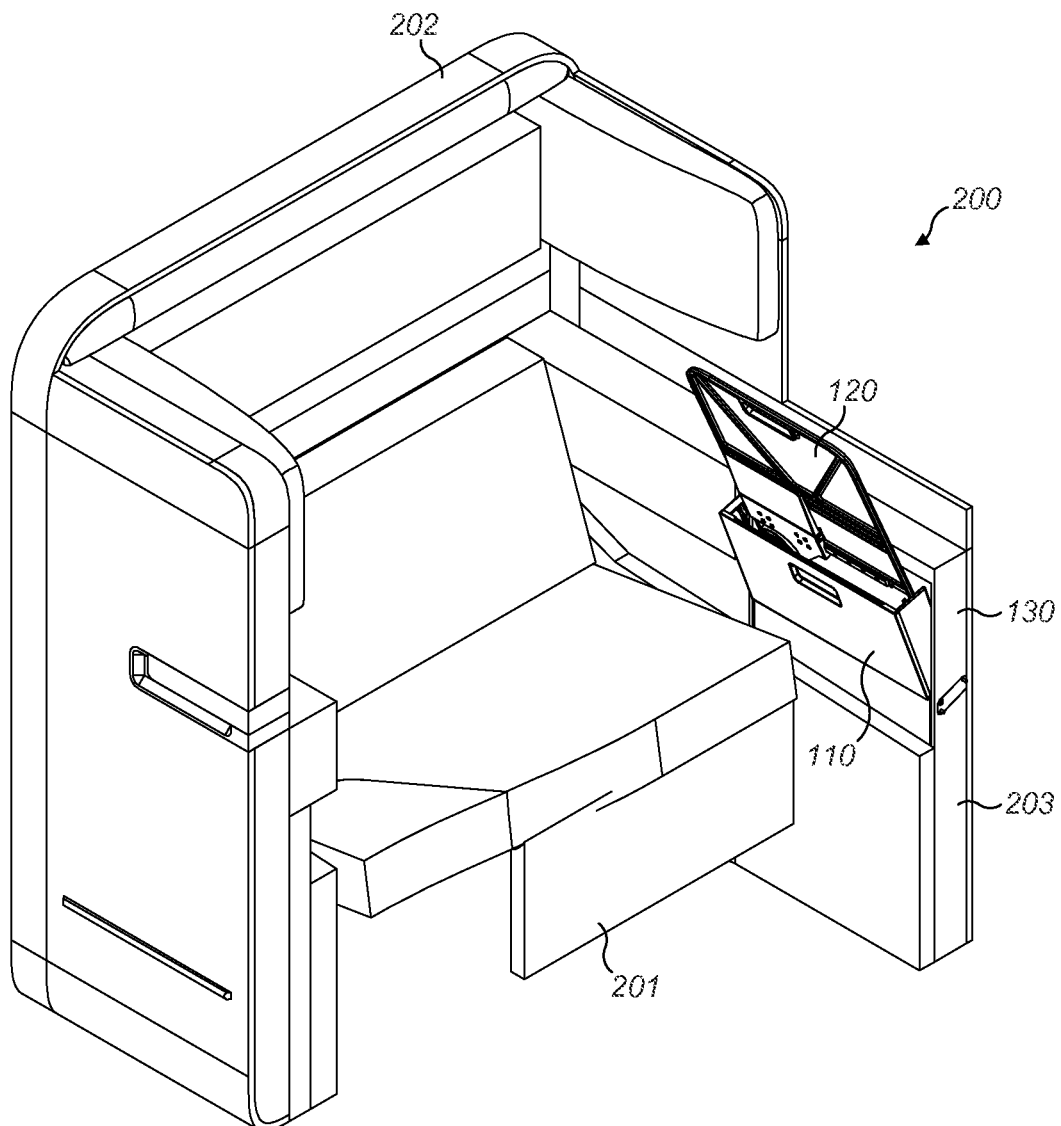
FIG. 3 shows a perspective view of the table arrangement in the partially deployed configuration, mounted in an aircraft seat module.

FIG. 3 shows the table arrangement 100 in place in an aircraft seat module 200. The aircraft set module comprises a seat 201 with an exterior shell 202 behind the seat. It also comprises a side console 203 in which the table arrangement 100 is provided. In particular, it is noted that the side console 203 provides the housing 130 of the table arrangement 100.

In use, the table 120 is moved from a stowed position to a presented position (as in FIGS. 1a and 1b) by opening door 110. This causes the table to automatically move up to the presented position. From here, a user/passenger can pull the table up to the partially deployed position (as in FIGS. 2a and 2c). This action requires the user to lift the table substantially vertically. The compensation arrangement (the spool 163 and band 164) assist in this by providing a spring force to counter act against the weight of the table 120, as described above. The user can then pivot the table 120 to a fully deployed horizontal position (as in FIGS. 2b and 2d).

To stow the table 120, it is pivoted to its angled partially deployed position, and then pushed back into (or allowed to drop back into) the presented position. As the table 120 drops back down, the band 164 is unwound from the spool 163, which causes the shaft 162 to rotate. The rotary damper 165 damps the rotation of the shaft 162 so as to slow down the table as it drops to the presented position, as described above. From there, the door 110 is shut which automatically drops the table 120 back down to the stowed position.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A table arrangement for use in an aircraft seat module, the table arrangement comprising:
   a table mounting structure,
   a table moveably mounted to the table mounting structure such that it can move between a lowered position and a raised position,
   a compensation arrangement connected between the table and table mounting structure for reducing the force required to lift the table from the lowered position to the raised position, and
   a damper arrangement for reducing the speed of the table as it moves from the raised position to the lowered position,
   wherein the compensation arrangement is mounted on a shaft, such that as the table is lowered, the shaft rotates about its longitudinal axis and wherein the damping arrangement is arranged to act on the shaft to reduce the speed of its rotation about its longitudinal axis.

2. A table arrangement as claimed in claim 1, wherein the compensation arrangement comprises a spool mounted on the shaft and an elongate member for winding onto and unwinding from the spool during lowering and raising of the table, wherein the compensation arrangement is biased such that the elongate member is urged to wind onto or unwind from the spool.

3. A table arrangement as claimed in claim 2, wherein lowering and raising of the table causes winding onto and unwinding from the spool by the elongate member, and rotation of the spool.

4. A table arrangement as claimed in claim 3, wherein the elongate member winds onto the spool during raising of the table.

5. A table arrangement as claimed in claim 3, wherein the spool is fixedly mounted on the shaft such that rotation of the spool causes rotation of the shaft about its longitudinal axis.

6. A table arrangement as claimed in claim 5, wherein the elongate member is biased to wind onto the spool.

7. A table arrangement as claimed in claim 6, wherein the elongate member is urged to wind onto the spool by a spring returning towards its default position, and wherein the spring is tensioned away from its default position when the elongate member is unwound from the spool.

8. A table arrangement as claimed in claim 7, wherein the shaft is mounted to the table and a free end of the elongate member is attached to the table mounting structure.

9. A table arrangement as claimed in claim 8, wherein the damping arrangement comprises a rotary damper mounted on the shaft, coaxially with the compensation arrangement.

10. A table arrangement as claimed in claim 9, wherein the direction of table movement between the lowered and raised positions is approximately within the plane of the table.

11. A table arrangement as claimed in claim 10, wherein the table mounting structure comprises a housing which stows the table in the lowered position.

12. A table arrangement as claimed in claim 11, wherein the table is slidably mounted to the table mounting structure with a cam follower and cam track arrangement.

13. A table arrangement as claimed in claim 12, wherein the raised position is a deployed position and the lowered position is a stowed position.

14. A table arrangement as claimed in claim 13, wherein the raised position is a partly deployed position.

15. An aircraft seat module comprising:
  a seat, and
  a table arrangement comprising:
    a table mounting structure,
    a table moveably mounted to the table mounting structure such that it can move between a lowered position and a raised position,
    a compensation arrangement connected between the table and table mounting structure for reducing the force required to lift the table from the lowered position to the raised position, and
    a damper arrangement for reducing the speed of the table as it moves from the raised position to the lowered position;
  wherein the compensation arrangement is mounted on a shaft, such that as the table is lowered, the shaft rotates about its longitudinal axis and wherein the damping arrangement is arranged to act on the shaft to reduce the speed of its rotation about its longitudinal axis, and
  wherein the table mounting structure is mounted to the aircraft seat module.

16. An aircraft seat module as claimed in claim 15, wherein the table is arranged such that it moves substantially vertically between the lowered and raised positions.

17. An aircraft comprising a table an aircraft seat module comprising:
  a seat, and
  a table arrangement comprising:
    a table mounting structure,
    a table moveably mounted to the table mounting structure such that it can move between a lowered position and a raised position,
    a compensation arrangement connected between the table and table mounting structure for reducing the force required to lift the table from the lowered position to the raised position, and
    a damper arrangement for reducing the speed of the table as it moves from the raised position to the lowered position;
  wherein the compensation arrangement is mounted on a shaft, such that as the table is lowered the shaft rotates about its longitudinal axis and wherein the damping arrangement is arranged to act on the shaft to reduce the speed of its rotation about its longitudinal axis, and
  wherein the table mounting structure is mounted to the aircraft seat module.

18. A method of deploying and stowing a table arrangement of an aircraft seat module, the table arrangement comprising a table mounting structure and a table moveably mounted to the table mounting structure such that the table can move between a lowered stowed position and a raised at least partly deployed position, a compensation arrangement connected between the table and table mounting structure and mounted on a shaft, and a damping arrangement, the method comprising the steps of:
  raising the table, with the assistance of the compensation arrangement, from the lowered position to the raised position, and
  lowering the table, with the assistance of gravity, thus causing the shaft to rotate and the damper arrangement to act on the shaft to reduce the speed of its rotation about its longitudinal axis, thereby reducing the speed of the table as it moves from the raised position to the lowered position.

* * * * *